(12) United States Patent
Nagai

(10) Patent No.: US 8,986,884 B2
(45) Date of Patent: Mar. 24, 2015

(54) LITHIUM ION SECONDARY BATTERY

(75) Inventor: Hiroki Nagai, Nagoya (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/823,758

(22) PCT Filed: Sep. 17, 2010

(86) PCT No.: PCT/JP2010/066251
§ 371 (c)(1),
(2), (4) Date: Mar. 15, 2013

(87) PCT Pub. No.: WO2012/035664
PCT Pub. Date: Mar. 22, 2012

(65) Prior Publication Data
US 2013/0177809 A1    Jul. 11, 2013

(51) Int. Cl.
*H01M 4/131* (2010.01)
*H01M 4/505* (2010.01)
*H01M 4/525* (2010.01)

(52) U.S. Cl.
CPC ............. *H01M 4/131* (2013.01); *H01M 4/505* (2013.01); *H01M 4/525* (2013.01); *Y02E 60/122* (2013.01)
USPC ...... 429/223; 429/224; 429/231.1; 429/231.3

(58) Field of Classification Search
CPC ...... H01M 4/525; H01M 4/505; H01M 4/131
USPC .............................. 429/223, 224, 231.1, 231.3
See application file for complete search history.

(56) References Cited

U.S. PATENT DOCUMENTS

| 2002/0006550 A1 | 1/2002 | Yang et al. |
| 2003/0206852 A1* | 11/2003 | Yang et al. ................. 423/594.4 |
| 2009/0035659 A1 | 2/2009 | Takeuchi et al. |
| 2009/0081548 A1 | 3/2009 | Nakura |
| 2009/0181305 A1 | 7/2009 | Nagayama et al. |

FOREIGN PATENT DOCUMENTS

| CN | 1307374 | 8/2001 |
| CN | 101120464 | 2/2008 |
| JP | 2006-310181 | 11/2006 |
| JP | 2006-351378 | 12/2006 |
| JP | 2006-351487 | 12/2006 |
| JP | 2007-27100 | 2/2007 |
| JP | 2008-53054 | 3/2008 |

* cited by examiner

*Primary Examiner* — Nicholas P D'Aniello
(74) *Attorney, Agent, or Firm* — Finnegan, Henderson, Farabow, Garrett & Dunner, LLP

(57) ABSTRACT

A lithium-ion secondary battery comprising a positive electrode and a negative electrode is provided. The positive electrode comprises as a positive electrode active material a lithium transition metal composite oxide having a layered structure. The composite oxide contains as its metal components at least one species of Ni, Co and Mn as well as W and Ca. The composite oxide contains 0.26 mol % or more, but 5 mol % or less of W and Ca combined when all the metal elements contained in the oxide excluding lithium account for a total of 100 mol %, with the ratio $(m_W/m_{Ca})$ of the number of moles of W contained, $m_W$, to the number of moles of Ca contained, $m_{Ca}$, being 2.0 or larger, but 50 or smaller.

13 Claims, 4 Drawing Sheets

LITHIUM ION SECONDARY BATTERY

CROSS-REFERENCE TO RELATED APPLICATIONS

This application is a national phase application of International Application No. PCT/JP2010/066251, filed Sep. 17, 2010, the content of which is incorporated herein by reference.

TECHNICAL FIELD

The present invention relates to a lithium-ion secondary battery that excels both in output properties at a low temperature and cycle properties at a high temperature.

BACKGROUND ART

A lithium-ion secondary battery comprises a positive electrode, a negative electrode, and a non-aqueous electrolyte solution present between these two electrodes; and charging and discharging are mediated by lithium ions in the electrolyte moving back and forth between the two electrodes. As the active substance that reversely stores and releases lithium ions at the positive electrode, a lithium-containing transition metal oxide is primarily used. Technical literatures relating to positive electrode materials include Patent Documents 1 and 2.

CITATION LIST

Patent Literatures

[Patent Document 1] Japanese Patent Application Publication No. 2006-351487
[Patent Document 2] Japanese Patent Application Publication No. 2008-53054

SUMMARY OF INVENTION

Technical Problem

In late years, as use of lithium-ion secondary batteries expands, improvement in various properties are desired according to the applications. For instance, in an application such as automobiles, etc., where output and input are repeated at high rates, better output properties (low reaction resistance, etc.) and greater durability (cycle properties, etc.) are in demand. Thus, it is useful to provide a lithium-ion secondary battery that exhibits both good output properties at a low temperature (e.g., −30° C. or below) and high durability at a relatively high temperature (e.g., around 60° C.).

One objective of the present invention is to provide a lithium-ion secondary battery that combines good low-temperature output properties and high-temperature cycle properties at the same time.

Solution to Problem

The present invention provides a lithium-ion secondary battery comprising a positive electrode and a negative electrode. The positive electrode comprises as a positive electrode active material a lithium transition metal composite oxide having a layered structure. The lithium transition metal composite oxide comprises as its metal components at least one species of Ni, Co and Mn. The lithium transition metal composite oxide further comprises as its metal components both W and Ca. The lithium transition metal composite oxide contains 0.26 mol % or more, but 5 mol % or less of W and Ca combined when all the metal elements contained in the oxide excluding lithium account for a total of 100 mol %. In the lithium transition metal composite oxide, the ratio ($m_W/m_{Ca}$) of the number of moles of W contained, $m_W$, to the number of moles of Ca contained, $m_{Ca}$, is 2.0 or larger, but 50 or smaller. A lithium-ion secondary battery having such a constitution may exhibit a sufficiently low reaction resistance at a low temperature, and even with repetitive cycles of charging and discharging at a high temperature, it may suffer a small decrease in the battery capacity.

The lithium transition metal composition metal composite oxide disclosed herein may be a lithium-containing composite oxide represented by general formula (I): $Li_xNi_aCo_b$-$Mn_cW_dCa_eO_2$. In the formula (I), x is a number that satisfies $1.05 \leq x \leq 1.25$. Variables a, b, c, d and e satisfy $0.99 \leq a+b+c+d+e \leq 1.0$. Among a, b and c, at least one variable is larger than zero. Variables d and e are both larger than zero and satisfy $0.0026 \leq d+e \leq 0.05$ as well as $2.0 \leq (d/e) \leq 50$. A lithium-ion secondary battery having such a constitution may give rise to a sufficiently low reaction resistance at a low temperature while it may suffer a small decrease in the battery capacity even with repetitive cycles of charging and discharging at a high temperature.

The art disclosed herein can be preferably applied to a lithium transition metal composite oxide containing all species of Ni, Co and Mn as its metal components, a positive electrode active material containing the said oxide, a positive electrode comprising the said positive electrode active material, and a battery (typically a lithium-ion secondary battery) comprising the said lithium transition metal composite oxide as a positive electrode active material. According to such applications, the effects of reduced reaction resistance and increased capacity retention rate can be produced to greater extent.

In a preferable embodiment of the art disclosed herein, the lithium transition metal composite oxide comprises W and Ca as constituents of the compound. According to a lithium-ion secondary battery comprising such a lithium transition metal composite oxide as a positive electrode active material, the effects of reduced reaction resistance and increased capacity retention rate can be produced to greater extent.

As described above, a lithium-ion secondary battery disclosed herein (which may be a lithium-ion secondary battery produced by a method disclosed herein) exhibits good output properties even at a low temperature and also good durability at a high temperature, it is preferable as a power source used in a vehicle. Thus, as shown in FIG. 3, the present invention provides a vehicle 1 comprising a lithium-ion secondary battery 100 disclosed herein. Particularly preferable is a vehicle (e.g., an automobile) comprising such a lithium-ion secondary battery as a power source (typically, as a power source in a hybrid vehicle or an electric vehicle).

DESCRIPTION OF EMBODIMENTS

Figure 1:
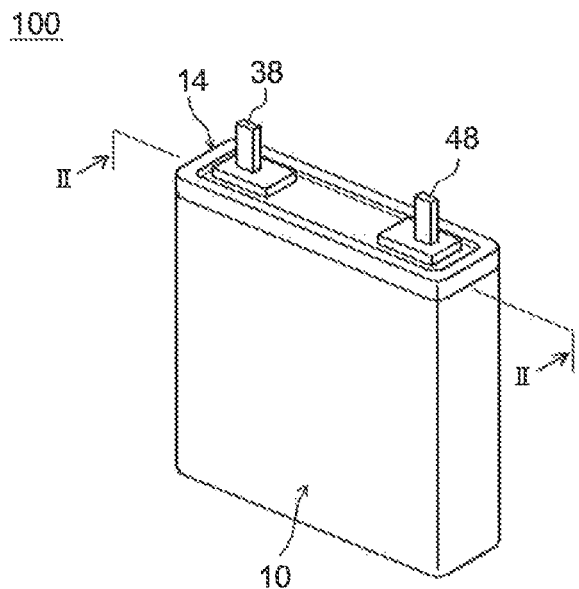
FIG. 1 shows a perspective view schematically illustrating the external form of a lithium-ion secondary battery according to an embodiment.

Preferred embodiments of the present invention are described below. Matters necessary to practice this invention other than those specifically referred to in this description may be understood as design matters to a person of ordinary skills in the art based on the conventional art in the pertinent field. The present invention can be practiced based on the contents disclosed in this description and common technical knowledge in the subject field.

The lithium-ion secondary battery disclosed herein comprises, as a positive electrode active material, a lithium transition metal composite oxide having a layered structure, with the lithium transition metal composite oxide comprising at least one species of Ni, Co and Mn and further comprising W and Ca as metal components. When the total amount of the metal elements contained in the lithium transition metal composite oxide, but excluding lithium, accounts for 100 mol %, the total amount of Ni, Co and Mn contained may be, for instance, 90 mol % or more (e.g., 95 mol % or more).

Such a lithium transition metal composite oxide may be, for example, a lithium-containing composite oxide (i) represented by the general formula (I). Herein, a, b, c, d and e in the formula (I) are numbers equal to or larger than zero, respectively. They also satisfy $0.99 \leq a+b+c+d+e \leq 1.0$. The sum d+e is 0.0026 or larger, preferably 0.0027 or larger, or more preferably 0.0028 or larger. The upper limit of d+e may be, for instance, about 0.1 (preferably 0.05). The sum d+e may be 0.02 or smaller, or smaller than 0.02. The die value is about 2.0 to 50 and is typically about 2.0 to 40 (e.g., 2.0 to 25). The die value may be larger than 2.0. Such a lithium-ion secondary battery may exhibit a sufficiently suppressed reaction resistance at a low temperature as well as good charge-discharge cycle properties even at a high temperature. When d+e is exceedingly small or die is exceedingly large, repetitive cycles of charging and discharging at a relatively high current density (e.g., about 4 C (1 C is a current value that allows a full charge or discharge in one hour) at a high temperature (e.g., around 60° C.) may cause a significant decrease in the discharge capacity of the battery (e.g., a decrease in the 4C-CC capacity retention rate measured under the conditions described in the worked examples shown later). When die is exceedingly small, the reaction resistance at a low temperature may increase (e.g., the −30° C. reaction resistance measured under the conditions described in the worked examples shown later may increase).

The respective numbers for d and e can be suitably selected in a range where d+e and d/e satisfy the prescribed conditions. For example, d can be about 0.001 (i.e., 0.1%) or larger. Variable d may be a number larger than 0.001. In a preferable embodiment, d is 0.0015 or larger (e.g., 0.002 or larger). The upper limit of d may be around 0.05 (i.e., 5%). For instance, it is preferable that d is smaller than 0.05 (typically 0.02 or smaller, e.g., smaller than 0.02). When d is exceedingly small, the low-temperature output properties may decrease, or the durability at a high temperature may decrease. Variable e may be, for instance, 0.00015 or larger (typically 0.0002 or larger, preferably 0.0003 or larger). In a preferable embodiment, e is 0.0005 or larger (typically a number larger than 0.0005). For example, e may be 0.0025 or smaller (typically smaller than 0.0025). Too large an e value may give rise to lower low-temperature output properties even if it yields good charge-discharge cycle properties. Too small an e value may lead to lower durability at a high temperature.

The lithium transition metal composite oxide disclosed herein preferably contains W and Ca as constituents in the compound (i.e., instead of forming a mixture with the lithium transition metal composite oxide, in a state where they are actually constituting a lithium compound). The state of being constituents of the compound can be confirmed, for instance, through TOF-SIMS spectra of the composite oxide. When W and Ca are present as constituents of the compound to a satisfactory level, in typical, peaks corresponding to $LiCaWO_4^+$, $Li_3CaW_2O_8O^+$, $CaWO_4^-$, $LiCaW_2O_8^-$, etc., can be found in the TOF-SIMS spectra. As for other peaks, for example, a particularly notable peak corresponding to $LiCaO^+$ and so on may allow confirmation of the state of being constituents of the compound. When their integration as constituents in the compound is not at a satisfactory level, the effect of increased durability at a high temperature may turn out small.

The lithium transition metal composite oxide disclosed herein may contain optional metal elements other than Li, Ni, Co, Mn, W, and Ca. As such optional metal elements, for example, Zr, Mg and the like are preferable. These optional metal elements may give rise to effects such as decreasing the reaction resistance at a low temperature and increasing the durability at a high temperature. The optional metal element content (when two or more species are contained, the respective contents) can be such that each optional metal element content is 1 mol % or less (typically less than 1 mol %) of the total amount of all the metal elements excluding Li, and it is usually preferable that each accounts for 0.1 mol % or less (typically less than 0.1 mol %). When two or more species of optional metal elements are contained, the total amount of these optional metal elements can be 2 mol % or less (typically less than 2 mol %) of the total amount of all the metal elements excluding Li, and it is usually preferable that they account for 0.2 mol % or less (typically less than 0.2 mol %). Alternatively, the lithium transition metal composite oxide may be essentially free of metal elements other than Li, Ni, Co, Mn, W and Ca (meaning that such optional metal elements are not intentionally included, but unintentional or inevitable inclusion of optional metal elements may be allowed).

As a method for producing such a lithium transition metal composite oxide, can be suitably employed a method capable of preparing the oxide as a final product. Matters disclosed by the present description include a lithium transition metal composite oxide produced by a method disclosed herein, a positive electrode active material comprising the said oxide, a positive electrode comprising the said positive electrode active material, and a battery (typically a lithium-ion secondary battery) comprising the said lithium transition metal composite oxide as a positive electrode active electrode active material.

For example, as a method for producing a lithium-containing composite oxide (i) represented by the formula (I), can be preferably employed a method comprising:

(A) a step comprising: preparing an aqueous solution that contains a salt containing a metal element with a to c in formula (I) being larger than zero (when preparing a lithium transition metal composite oxide containing two or more species of Ni, Co and Mn, can be used salts individually containing the respective metal elements or a salt containing two or more species of the metal elements) as well as a calcium salt (which hereinafter may be referred to as a transition metal-calcium salt aqueous solution), and further preparing an aqueous solution containing a tungsten-containing salt mixing these aqueous solution under a basic condition of pH 11 to 14; and preparing, by a liquid-phase reaction in the mixed solution (typically by precipitating out particles of the precursor from the mixed solution), a precursor represented by general formula (II): $Ni_aCo_bMn_cW_dCa_e(OH)_{2+\alpha}$; and (B) a step comprising: preparing a lithium-containing composite oxide represented by the general formula (I) by calcining a mixture of the precursor and a lithium salt. Herein, a, b, c, d and e in the formula (II) satisfy $0.99 \leq a+b+c+d+e \leq 1.0$. Among a, b and c, at least one is larger than zero. Both d and e are larger than zero, and satisfy both $0.0026 \leq d+e \leq 0.05$ and $2.0 \leq (d/e) \leq 50$. According to such a method, the positive electrode active material can be suitably produced. In the step A, to an aqueous basic solution having an initial pH of 11 to 14, while keeping the initial pH approximately constant, can be mixed the transition metal-calcium salt aqueous solution and an aqueous solution containing a tungsten-containing salt.

Referring mainly to preparation of a lithium transition metal composite oxide with a, b and c in the formula (I) being all larger than zero (i.e., a composite oxide containing all Ni, Co and Mn as metal components) as an example, the method is described more in detail below although it is not to limit the application of the art disclosed herein to an oxide having such a composition.

In a preferable embodiment of such a production method, the precursor (ii) prepared via the step A (which can be understood as a liquid-phase reaction step or a solution-solution mixing step) is mixed with a suitable lithium salt and subjected to calcination at a prescribed temperature to form a lithium transition metal composite oxide of interest. Here, in the step A, to an aqueous basic solution having an initial pH of 11 to 14, while maintaining the initial pH, an aqueous solution containing a nickel salt, a cobalt salt a manganese salt and a calcium salt (which hereinafter may be referred to as an aqueous Ni Co Mn Ca solution) as well as an aqueous solution containing a tungsten-containing salt (which hereinafter may be referred to as an aqueous W solution) can be added, mixed and stirred at prescribed rates. During these procedures, it is preferable that the temperature of the reaction mixture is n a range of 20° C. to 60° C.

By using a precursor (ii) obtained in the step A, can be preferably formed a composite oxide represented by the formula (I). The composite oxide (i) produced by such a method may comprise W and Ca as sufficiently integrated as constituents of the compound. A lithium-ion secondary battery using such a composite oxide a composite oxide as a positive electrode active material may excel both in low-temperature output properties and high-temperature cycle properties. When mixing the precursor (ii) and a lithium salt, can be employed either of wet mixing and dry mixing which does not use any solvent. From the standpoint of the convenience and the cost-effectiveness, dry mixing is preferable.

As the aqueous basic solution, can be preferably used a solution that contains a strong base (a hydroxide of an alkali metal, etc.) and a week base (ammonia, etc.) and that is able to keep pH at around 11 to 14 at a liquid temperature of 25° C. and does not inhibit the formation of the precursor (ii) when prescribed amounts of an aqueous Ni Co Mn Ca solution and an aqueous W solution are added. In typical, a mixed solution of an aqueous sodium hydroxide solution and an aqueous ammonia is used. The mixed solution is preferably prepared so as to have a pH in a range of 11 to 14 (e.g., about pH 12) and an ammonia concentration of 3 g/L to 25 g/L. While the aqueous basic solution as well as the aqueous Ni Co Mn Ca solution and the aqueous W solution are mixed to form a reaction mixture and the formation reaction of the precursor (ii) is taking place, it is preferable to keep the ammonia concentration of the reaction mixture at around 3 g/L to 25 g/L.

The aqueous Ni Co Mn Ca solution can be prepared, for instance, by dissolving prescribed amounts of desirable nickel salt, cobalt salt, manganese salt and calcium salt in an aqueous solvent. The order of adding these salts to the aqueous solvent is not particularly limited. Alternatively, it can be prepared by mixing aqueous solutions of the respective salts. Alternatively; an aqueous solution containing a nickel salt, a cobalt salt and a manganese salt can be mixed with an aqueous solution of a calcium salt. Anions of these metal salts (the nickel salt, cobalt salt, manganese salt, calcium salt) can be selected so that the respective salts will have desirable aqueous solubilities. For instance, they can be sulfate ion, nitrate ion, chloride ion, carbonate ion, and the like. In other words, the metal salts can be sulfate salts, nitrate salts, chloride salts, carbonate salts, etc., of nickel, cobalt, manganese and calcium, respectively. Among the anions of these metal salts, all or a few may be the same, or they can be different from each other. For example, sulfate salts of nickel, cobalt and manganese can be used in combination with carbonate salt of calcium. These salts may be solvates such as hydrates or the like, respectively. The order of adding these metal salts are not particularly limited. It is preferable that the aqueous Ni Co Mn Ca solution has a concentration of 1 mol/L to 2.2 mol/L for all the transition metals (Ni, Co, Mn, Ca) combined.

The aqueous W solution can be similarly prepared by dissolving a prescribed amount of a W-containing salt in an aqueous solvent. As the W-containing salt, a salt of tungstic acid (an oxoacid having W as the central element) is typically used. The cation contained in the W-containing salt can be suitably selected so that the salt will be water soluble. For instance, it can be ammonium ion, sodium ion, potassium ion, or the like. As the W-containing salt, for example, ammonium paratungstate can be preferably used. The W-containing salt can be a solvate such as a hydrate or the like. It is preferable that the aqueous W solution has a concentration of about 0.01 mol/L to 1 mol/L based on the element of W.

The aqueous solvents used for preparation of the aqueous Ni Co Mn Ca solution and the aqueous W solution are typically water, and depending on the solubilities of the respective salts to be used, water containing a reagent (acid, base, etc.) that increases their solubilities may be used.

The amounts of the Ni salt, Co salt, Mn salt, Ca salt, and the W-containing salt to be used can be suitably selected based on the molar ratio among Ni, Co, Mn, W and Ca selected so that a, b, c, d and e in the formula (I) have a desirable ratio within the prescribed range.

In production of the composite oxide (i), for instance, when an aqueous solution of a Ca salt and an aqueous solution of a W-containing salt (typically a salt of a W oxoacid) are simply mixed, a salt containing Ca and W (e.g., a tungstate salt containing cations of Ca) may precipitate out. When a W-containing salt in place of a Ca salt is dissolved in water along with a Ni salt and a Co salt as well as a Mn salt, a salt containing Ni, Co, Mn and W (e.g., a tungstate salt containing cations of Ni, Co and Mn) may precipitate out. For example, when a composite hydroxide containing Ni, Co and Mn produced by a conventional method is dry mixed (mixed as powdered solids without use of a solvent) with a Ca salt and a W-containing salt and the resulting mixture is subsequently calcined along with a lithium salt, W and Ca may not be sufficiently integrated as constituents in the compound.

Upon completion of crystallization, the precursor (ii) precipitated out of the liquid phase by the step A can be washed with water, isolated by filtration, allowed to dry, and pulverized into particles having a prescribed particle diameter. The precursor (ii) is preferably subjected to a subsequent process after heated in the atmosphere at 100° C. to 300° C. for a prescribed time period (e.g., 5 hours to 24 hours).

The composite oxide (i) can be formed by calcining a mixture of the precursor (ii) and a suitable lithium salt typically in air. As the lithium salt, any general lithium salt used for formation of a lithium composite oxide can be used without particular limitations. Specific examples include lithium carbonate, lithium hydroxide, and the like. Among these lithium salts, one species can be used solely, or two or more species can be used in combination. The mixing ratio of the precursor (ii) to the lithium salt may be suitably selected based on the number of moles of the lithium salt relative to the total number of moles of all the transition metals contained in the precursor (ii), which are in turn selected so as to obtain a desirable ratio of (a+b+c+d+e) to x in the formula (I).

It is preferable that the calcination temperature is in a range of about 700° C. to 1000° C. Calcination can be carried out once at a constant temperature, or carried out stepwise at different temperatures. The time period for calcination can be suitably selected. For instance, calcination can be carried out at around 800° C. to 1000° C. for about 2 to 24 hours. Alternatively, it can be subjected to calcination at around 700° C. to 800° C. for about 1 to 12 hours followed by calcination at around 800° C. to 1000° C. for about 2 to 24 hours.

After the thus-obtained lithium-containing composite oxide (i) is pulverized, it can be used after sieving as necessary to have a prescribed particle diameter. It is usually preferable that the composite oxide (i) as a positive electrode active material has an average particle diameter (typically referring to the mode diameter measured by laser diffraction) of about 3 µm to 7 µm. It preferably has a specific surface area in a range of 0.5 $m^2$/g to 1.8 $m^2$/g.

The present invention provides a lithium-ion secondary battery characterized by comprising a positive electrode that comprises a positive electrode active material disclosed herein. An embodiment of such a lithium-ion secondary battery is described in detail with an example of a lithium-ion secondary battery 100 (FIG. 1) having a configuration where an electrode body and a non-aqueous electrolyte solution are placed in a square battery case while the art disclosed herein is not limited to such an embodiment. In other words, the shape of the lithium-ion secondary battery disclosed herein is not particularly limited, and the materials, shapes, sizes, etc., of components such as the battery case, electrode body, etc., can be suitably selected in accordance with its intended use and capacity. For example, the battery case may have a cubic, flattened, cylindrical, or other shape. In the following drawings, all members and sites providing the same effect are indicated by a common reference numeral, and redundant descriptions may be omitted or abbreviated. Moreover, the dimensional relationships (of length, width, thickness, etc.) in each drawing do not represent actual dimensional relationships.

Figure 2:
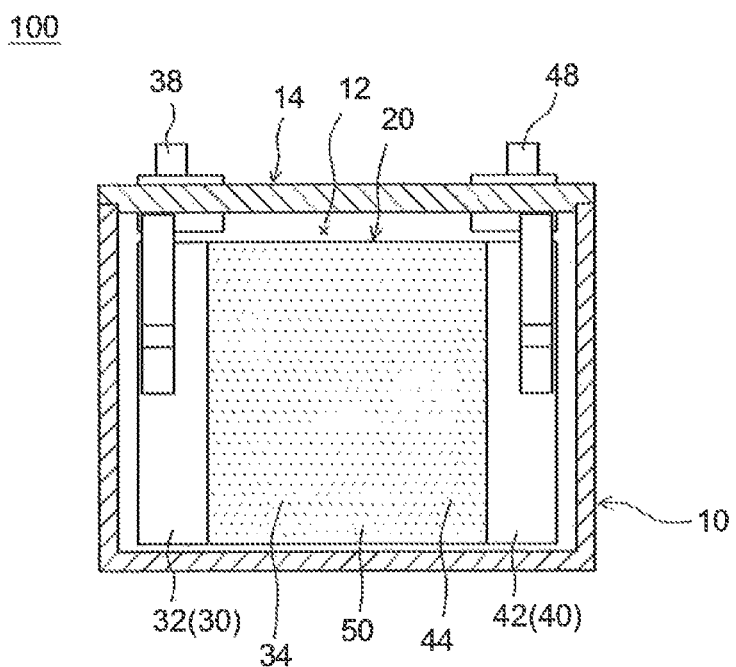
FIG. 2 shows a cross-sectional view taken along line II-II in FIG. 1.
Figure 3:
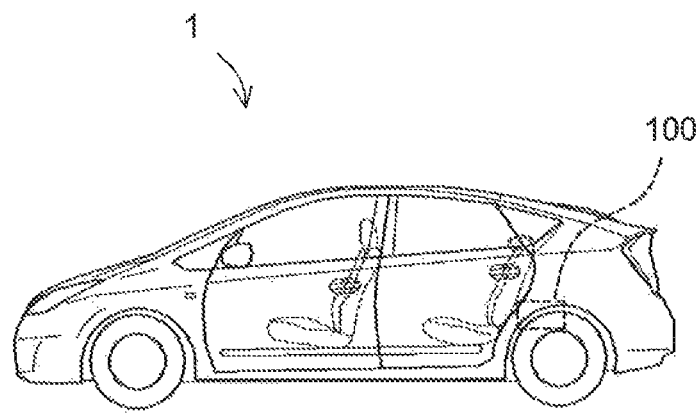
FIG. 3 shows a side view schematically illustrating a vehicle (automobile) comprising a lithium-ion secondary battery according to the present invention.
Figure 4:
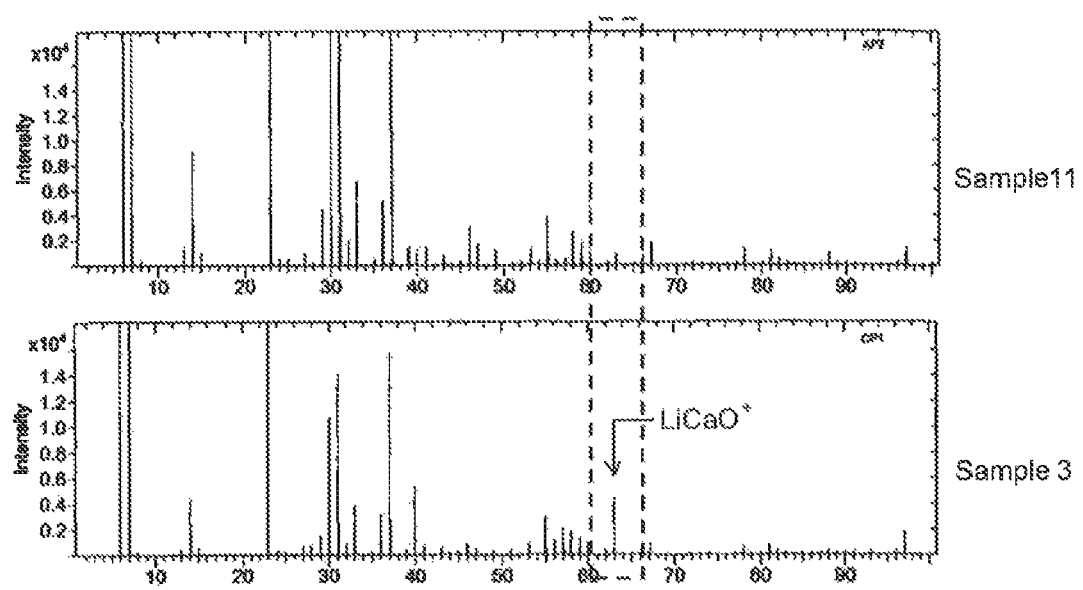
FIG. 4 shows part of positive TOF-SIMS (time-of-flight secondary ion mass spectrometry analysis) spectra of the lithium transition metal composite oxides according to Example 11 and Example 3.
Figure 5:
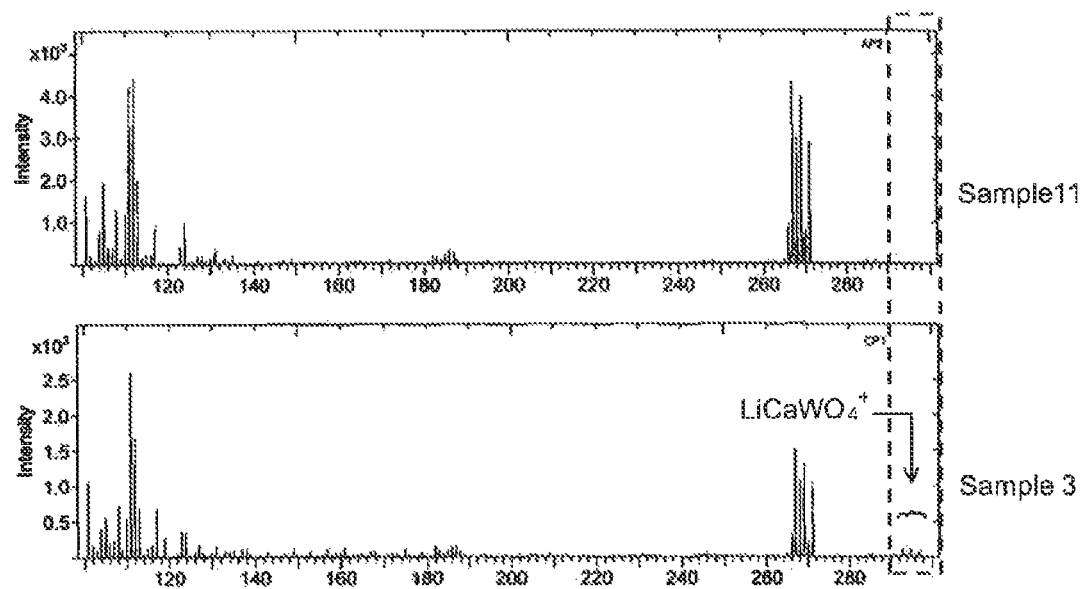
FIG. 5 shows part of positive TOF-SIMS spectra of the lithium transition metal composite oxides according to Example 11 and Example 3.
Figure 6:
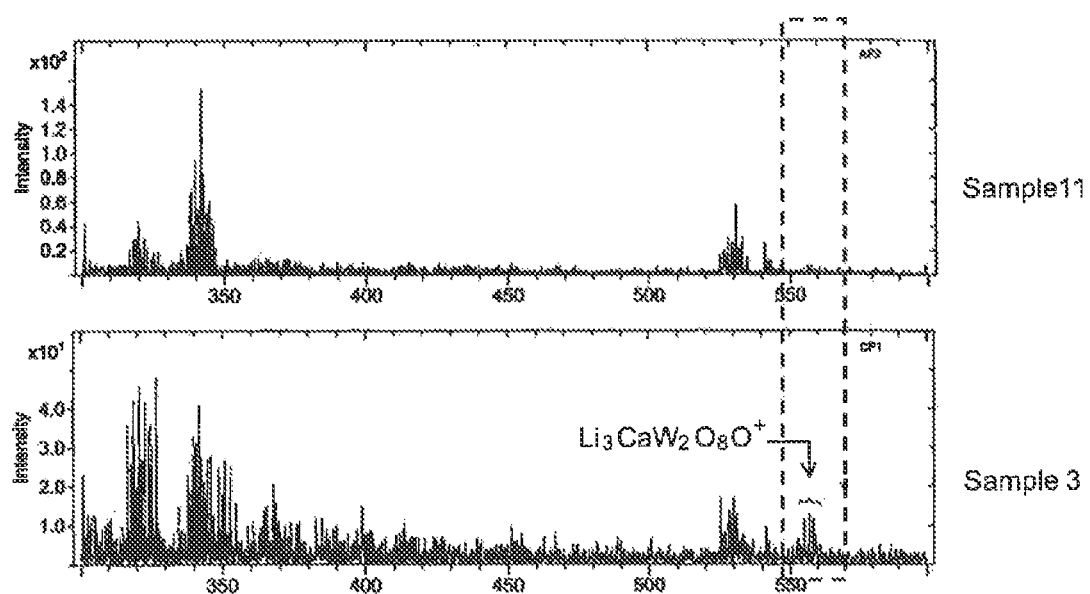
FIG. 6 shows part of positive TOF-SIMS spectra of the lithium transition metal composite oxides according to Example 1 and Example 3.
Figure 7:
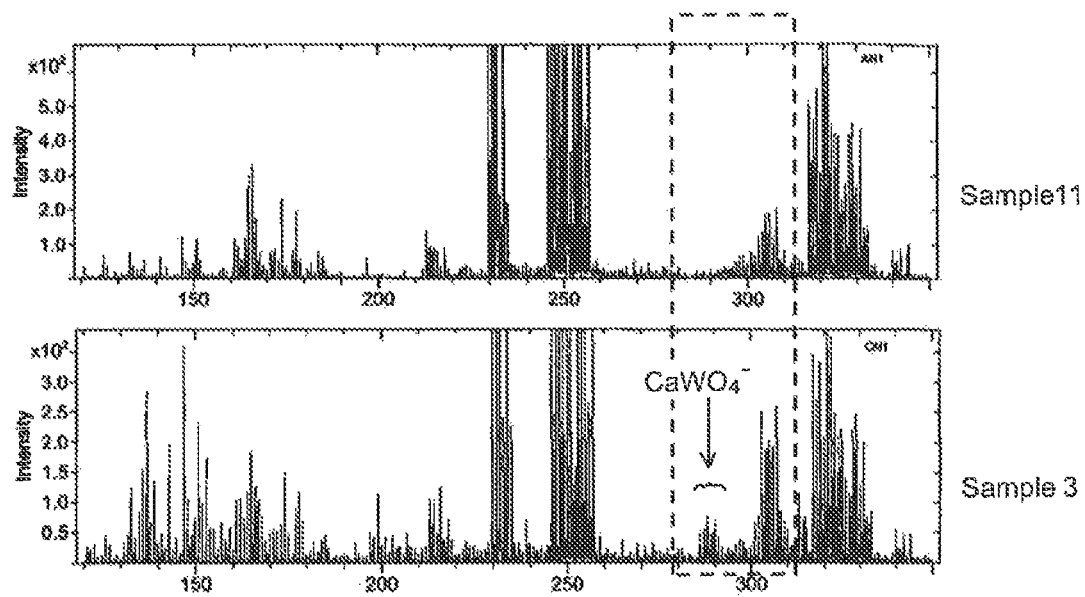
FIG. 7 shows part of negative TOF-SIMS spectra of the lithium transition metal composite oxides according to Example 11 and Example 3.
Figure 8:
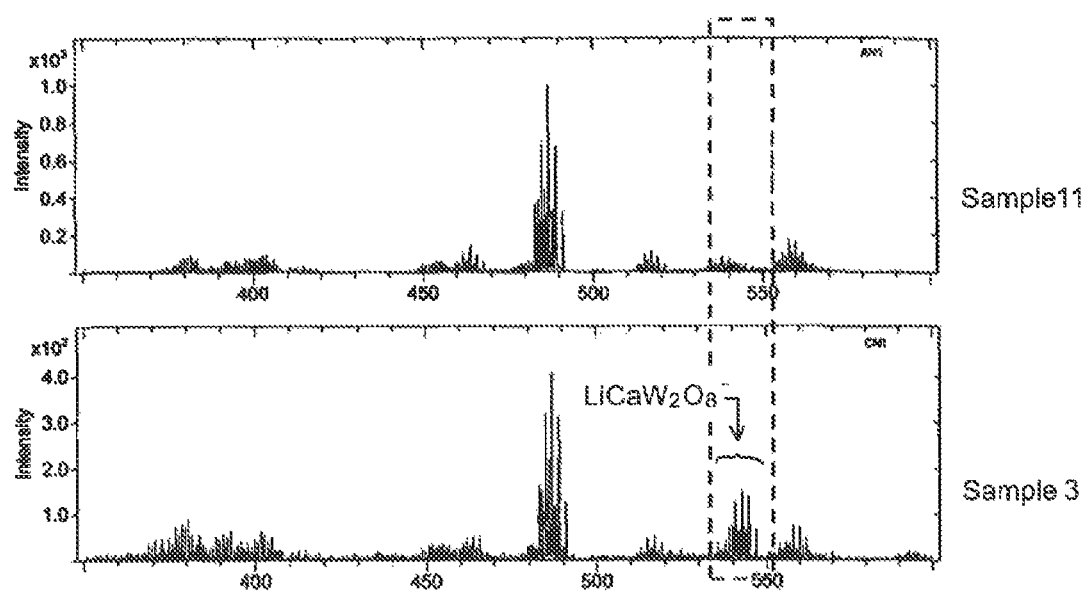
FIG. 8 shows part of negative TOF-SIMS spectra of the lithium transition metal composite oxides according to Example 11 and Example 3.

As shown in FIG. 1 and FIG. 2, a lithium-ion secondary battery 100 can be constructed by placing a wound electrode body 20 along with an electrolyte solution not shown in the drawing via an opening 12 into a flat box-shaped battery case 10 suitable for the shape of the electrode body 20, and closing the opening 12 of the case 10 with a lid 14. The lid 14 has a positive terminal 38 and a negative terminal 48 for connection to the outside, with the terminals partially extending out from the surface of the lid 14.

The electrode body 20 is formed into a flattened shape by overlaying and winding up a positive electrode sheet 30 in which a positive electrode active material layer 34 is formed on the surface of a long sheet of a positive current collector 32 and a negative electrode sheet 40 in which a negative electrode active material layer 44 is formed on a long sheet of a negative current collector 42 along with two long sheets of separators 50, and laterally compressing the resulting wound body.

The positive electrode sheet 30 is formed to expose the positive current collector 32 on an edge along the sheet length direction. In other words, the positive electrode active material layer 34 is not provided or has been removed after formed. Similarly; the negative electrode sheet 40 to be wound is formed to expose the negative current collector 42 on an edge along the sheet length direction. The positive terminal 38 is joined to the exposed edge of the of the positive current collector 32 and the negative terminal 48 is joined to the exposed edge of the negative current collector 42, respectively, to form electrical connections with the positive electrode sheet 30 and the negative electrode sheet 40 of the flattened wound electrode body 20. The positive and negative terminals 38 and 48 can be joined to the respective positive and negative current collectors 32 and 42, for example, by ultrasonic welding, resistance welding and so on.

The positive electrode sheet 30 can be preferably fabricated, for instance, by applying to the positive current collector 32 a paste or slurry composition (positive electrode material mixture) obtained by dispersing in a suitable solvent a positive electrode active material disclosed herein along with a conductive material, a binder, etc., as necessary, and by drying the composition.

As the conductive material, can be preferably used a powdered conductive material such as carbon powder, carbon fibers, and so on. As the carbon powder, various kinds of carbon black such as acetylene black, ace black, Ketjen black, graphite powder and the like are preferable. One kind of conductive material can be used solely, or two or more kinds can be used in combination. The amount of conductive material contained in the positive electrode active material layer may be suitably selected, and, for instance, it can be about 5 to 12% by mass.

As the binder, for instance, one, two or more species suitably selected from water-soluble polymers that dissolve in water, water-dispersible polymers, polymers that dissolve in a non-aqueous solvent (organic solvent), and so on can be used. Examples of a water-soluble polymer include carboxy methylcellulose (CMC), polyvinyl alcohols (PVA), and the like. Examples of a water-dispersible polymer include polytetrafluoroethylene (PTFE), styrene butadiene block copolymer (SBR), and the like. Examples of a polymer that dissolve in a non-aqueous solvent (organic solvent) include poly(vinylidene fluoride) (PVDF), and the like. The amount of binder contained in the positive electrode active material layer can be suitably selected, and, for example, it can be about 1.5 to 10% by mass.

As the positive current collector 32, can be preferably used a conductive material formed of a metal having good conductivity. For example, aluminum or an alloy containing aluminum as the primary component can be used. The shape of the positive current collector 32 is not particularly limited as it may vary in accordance with the shape, etc., of the lithium-ion secondary battery, and it may have a variety of shapes such as a rod, plate, sheet, foil, mesh, and so on. For example, an aluminum sheet having a thickness of about 10 μm to 30 μm can be preferably used.

The negative electrode sheet 40 can be preferably fabricated, for instance, by applying to the negative current collector 42 a paste or slurry composition (negative electrode material mixture) obtained by dispersing in a suitable solvent a negative electrode active material along with a binder, etc., as necessary, and by drying the composition.

As the negative electrode active material, one, two or more kinds of substances conventionally used in lithium-ion secondary batteries can be used without particular limitations. Examples of a preferable negative electrode active material include carbon particles. A particulate carbon material (carbon particles, e.g., particles of graphite such as natural graphite, etc.) at least partly comprising a graphite structure (layered structure) can be used preferably. As the binder, can be used the same kinds listed for the positive electrode. The amount of binder contained in the negative electrode active material layer can be suitably selected, and, for instance, it can be about 1.5 to 10% by mass.

As the negative current collector 42, can be preferably used a conductive material formed of a metal having good conductivity. For instance, copper or an alloy containing copper as the primary component can be used. Similarly to the positive current collector 32, the negative current collector 42 may take a variety of shapes. For example, a copper sheet having a thickness of about 6 μm to 30 μm can be preferably used.

The non-aqueous electrolyte solution comprises an electrolyte (a supporting salt) in a non-aqueous solvent (organic solvent). As the electrolyte, among lithium salts used as electrolytes in general lithium-ion secondary batteries, one, two or more species can be suitably selected and used. Examples of such a lithium salt include $LiPF_6$, $LiBF_4$, $LiClO_4$, $LiAsF_6$, $Li(CF_3SO_2)_2N$, $LiCF_3SO_3$, and the like. $LiPF_6$ can be given as an especially preferable example. It is preferable to prepare the non-aqueous electrolyte solution to have an electrolyte concentration within a range of, for instance, 07 mol/L to 1.3 mol/L.

As the non-aqueous solvent, among organic solvents used for electrolyte solutions of general lithium-ion secondary batteries, one, two or more species can be suitably selected and used. Examples of an especially preferable non-aqueous solvent include carbonates such as ethylene carbonate (EC), diethyl carxonate (DEC), dimethyl carbonate (DMC), ethyl methyl carbonate (EMC), vinylene carbonate (VC), propylene carbonate (PC), and so on. For example, a mixed solvent of EC and DEC can be preferably used.

As the separator 50, a heretofore known separator can be used without particular limitations. For example, a porous sheet (micro-porous resin sheet) formed of a resin can be preferably use. A porous resin sheet of a polyolefin such as polyethylene (PE), polypropylene (PP), polystyrene, or the like is preferable. In particular, a PE sheet, a PP sheet, a multilayer sheet comprising overlaid PE and PP layers, and the like can be used preferably. The thickness of the separator is preferably selected, for instance, within a range of about 10 μm to 40 μm.

Several embodiments relevant to the present invention are described below although this is not to limit the present invention to these embodiments. In the following explanation, the terms "parts" and "%" are based on the mass unless specifically stated otherwise.

Fabrication of 18650 Battery

Example 1

To a reaction vessel equipped with a stirring device and a nitrogen inlet, approximately a half its volume of water was placed and heated with stirring to 40° C. After the reaction vessel was purged with nitrogen, under a nitrogen flow, while keeping a non-oxidative atmosphere having an oxygen concentration of about 2.0% inside the reaction vessel, were added suitable amounts of 25% aqueous sodium hydroxide solution and 25% aqueous ammonia to obtain a pH of 12.0 at a liquid temperature of 25° C. and an liquid-phase ammonia concentration of 20 g/L, whereby an aqueous basic solution was obtained. The oxygen concentration inside the reaction vessel was around 2.0%.

Nickel sulfate, cobalt sulfate, manganese sulfate and calcium carbonate were dissolved in water so that the molar ratio of the metal elements Ni:Co:Mn:Ca was 0.33:0.33:0.33:0.00023 and the concentration of these metals combined was 1.8 mol/L, whereby an aqueous Ni Co Mn Ca solution was prepared.

Ammonium paratungstate was dissolved in water to prepare an aqueous W solution having a tungsten (W) concentration of 0.05 mol/L.

To the aqueous basic solution in the reaction vessel, were added and mixed the aqueous Ni Co Mn Ca solution and the aqueous W solution obtained above as well as 25% aqueous sodium hydroxide solution and 25% aqueous ammonia while keeping the pH of the reaction mixture at 12.0. The pH was adjusted by controlling the supply rates of the respective solutions to the reaction vessel.

The precipitated product was isolated, washed with water, and allowed to dry to obtain a hydroxide $(Ni_{0.33}Co_{0.33}Mn_{0.33}W_{0.008}Ca_{0.00023}(OH)_{2+\alpha}$ $(0 \leq \alpha \leq 0.5)$; precursor) having an elemental molar ratio Ni:Co:Mn:W:Ca of 0.33:0.33:0.33:0.008:0.00023 (i.e., the mol % of Ni, Co, Mn, W and Ca were 33%, 33%, 33%, 0.8% and 0.023%, respectively). This precursor (hydroxide particles) was stored in the atmosphere at a temperature of 150° C. for 12 hours.

When M is the total number of moles of all the transition metals (i.e., Ni, Co, Mn, W, Ca) in the precursor, calcium carbonate was weighed out and mixed with the precursor so that the molar ratio of lithium to M (Li/M) was 1.15. In air having 21% by volume of oxygen, the resulting mixture was calcined at 950° C. for 10 hours to obtain a lithium-containing composite oxide $(Li_{1.15}Ni_{0.33}Co_{0.33}Mn_{0.33}W_{0.008}Ca_{0.00023}O_2)$. This was pulverized and sieved to obtain fine particles of a lithium transition metal composite oxide (Sample 1) having an average particle diameter of 5.2 μm and a specific surface area of 1.08 $m^2/g$.

Using Sample 1 obtained above as a positive electrode active material, a lithium-ion secondary battery was fabricated. In other words, Sample 1, acetylene black (conductive material) and PVDF were mixed so as to obtain a Sample 1 to conductive material to PVDF ratio of 89:8:3, and N-methyl-2-pyrrolidon (NMP) was added to obtain a mixture as a paste.

This paste mixture was applied to each face of a long aluminum sheet of 15 μm thickness so that the applied amount on both faces combined was 12.8 mg/cm$^2$. This was dried and rolled to obtain a positive electrode sheet having an overall thickness of 74 μm.

Natural graphite, SBR and CMC were mixed at a mass ratio of 98:1:1, and ion-exchanged water was added to obtain a mixture as a paste. This mixture was applied to each face of a long copper sheet of 10 μm thickness so that the applied amount on both faces combined was 8 mg/cm$^2$. This was dried and rolled to obtain a negative electrode sheet having an overall thickness of 68 μm.

The positive electrode sheet and the negative electrode sheet were wound into the length direction along with two separator sheets (long porous polyethylene sheets of 20 μm thickness) to fabricate an electrode body. This electrode body was placed in a cylindrical container along with a 1 mol/L LiPF$_6$ solution (in a mixed solvent of EC, DMC and EMC (volume ratio 1:1:1) to obtain a 18650 (18 mm in diameter, 65 mm high) lithium-ion secondary battery.

Example 2

Except that the elemental molar ratio Ni:Co:Mn:W:Ca was 0.33:0.33:0.33:0.008:0.00038, in the same manner as Example 1, was obtained a lithium-ion secondary battery of this example.

Example 3

Except that the elemental molar ratio Ni:Co:Mn:W:Ca was 0.33:0.33:0.33:0.005:0.00055, in the same manner as Example 1, was obtained a lithium-ion secondary battery of this example.

Example 4

Except that the elemental molar ratio Ni:Co:Mn:W:Ca was 0.33:0.33:0.33:0.002:0.00086, in the same manner as Example 1, was obtained a lithium-ion secondary battery of this example.

Example 5

Except that the elemental molar ratio Ni:Co:Mn:W:Ca was 0.33:0.33:0.33:0.005:0.00103, in the same manner as Example 1, was obtained a lithium-ion secondary battery of this example.

Example 6

Except that the elemental molar ratio Ni:Co:Mn:W:Ca was 0.33:0.33:0.33:0.010:0.00159, in the same manner as Example 1, was obtained a lithium-ion secondary battery of this example.

Example 7

Except that the elemental molar ratio Ni:Co:Mn:W:Ca was 0.33:0.33:0.33:0.005:0.00220, in the same manner as Example 1, was obtained a lithium-ion secondary battery of this example.

Example 8

Except that the elemental molar ratio Ni:Co:Mn:W:Ca was 0.33:0.33:0.33:0.00005:0.00055, in the same manner as Example 1, was obtained a lithium-ion secondary battery of this example.

Example 9

Except that the elemental molar ratio Ni:Co:Mn:W:Ca was 0.33:0.33:0.33:0.005:0.00282, in the same manner as Example 1, was obtained a lithium-ion secondary battery of this example.

Example 10

Except that the elemental molar ratio Ni:Co:Mn:W:Ca was 0.33:0.33:0.33:0.008:0.00012, in the same manner as Example 1, was obtained a lithium-ion secondary battery of this example.

It is noted that the lithium transition metal composite oxides used for the positive electrode active materials in Examples 2 to 10 are referred to as Samples 2 to 10, respectively.

Example 11

To a reaction vessel equipped with a stirring device and a nitrogen inlet, approximately a half its volume of water was placed and heated with stirring to 40° C. After the reaction vessel was purged with nitrogen, under a nitrogen flow, were added suitable amounts of 25% aqueous sodium hydroxide solution and 25% aqueous ammonia to obtain a pH of 12.0 at a liquid temperature of 25° C. and an liquid-phase ammonia concentration of 20 g/L, whereby an aqueous basic solution was obtained. The oxygen concentration inside the reaction vessel was around 2.0%.

Nickel sulfate, cobalt sulfate and manganese sulfate were added to the water in the reaction vessel so that the elemental molar ratio Ni:Co:Mn was 0.33:0.33:0.33 and the concentration of Ni, Co and Mn combined was 1.8 mol/L, and the mixture was stirred to dissolve these salts. The precipitated product was isolated, washed with water, and allowed to dry to obtain a Ni Co Mn composite hydroxide ($Ni_{0.03}Co_{0.33}Mn_{0.33}(OH)_2$).

The Ni Co Mn composite hydroxide, lithium carbonate, tungsten (VI) oxide, and calcium carbonate were dry mixed without use of a solvent so as to obtain a solvent so as to obtain a molar ratio Li:Ni:Co:Mn:W:Ca of 1.15:0.33:0.33:0.33:0.002:0.00054. In air having 21% by volume of oxygen, this mixture was calcined at 760° C. for 4 hours and then at 950° C. for 10 hours to obtain a lithium-containing composite oxide. This was pulverized and sieved to obtain a powdery lithium transition metal composite oxide (Sample 11) having an average particle diameter of 5.0 μm and a specific surface area of 1.14 m$^2$/g. Except that this was used as the positive electrode active material, in the same manner as Example 1, was obtained lithium-ion secondary battery of this example.

TOF-SIMS Analysis

With respect to the lithium transition metal composite oxides as fine particles prepared in Examples 1 to 11, using a TOF-SIMS system (available from ION-TOF GmbH, model number "TOF.SIMS 5"), time-of-flight primary ion mass spectrometry analysis was carried out to obtain spectra. Each spectrum was checked for the presence or absence of peaks of LiCaO$^+$, LiCaWO$_4{}^+$, Li$_3$CaW$_2$O$_8$O$^+$, CaWO$_4{}^-$, and LiCaW$_2$O$_8{}^-$. Among these spectra, positive and negative spectra according to Example 3 (Sample 3) and Example 11 (Sample 11) are partially shown in FIGS. 4 to 8. The TOF-SIMS measurement conditions were as follows:

primary ion: Bi$_3{}^{2+}$
primary ion energy: 25 kV
pulse width: 5.1 ns
punching: yes
charge neutralization: none
vacuum level for measurement: 4×10$^{-7}$ Pa (3×10$^{-9}$ Torr)
secondary ion polarity: positive, negative
mass range (m/z): 0µ to 1500µ
cluster size: 200 µm
number of scans: 16
number of pixels: 256 pixels
post acceleration: 10 kV Conditioning Process Each battery was subjected to constant current (CC) charging at a rate of 1/10 C for three hours, and subsequently, a set of procedures of charging at a rate of 1/3 C to 4.1 V and discharging at a rate of 1/3 C to 3 V was repeated three times.

Each conditioned battery was subjected battery was subjected to the following measurements. The results along with the characteristics of the positive electrode active materials are shown in Table 1. The mol % of W and Ca in Table 1 indicate, respectively, the values when the combined amount of metal elements excluding lithium is 100 mol %.

Measurement of Initial Discharge Capacity

At a temperature of 25° C., each battery initially charged to a voltage across the two terminals of 4.1 V was CC-discharged at a rate of 1 C until the voltage across the two terminals reached 3 V, and then discharged at a constant voltage (CV) of the said voltage for two hours. After a 10 minute break, it was CC-charged at a rate of 1 C until the voltage across the two terminals reached 4.1 V, and then CV charged at the said voltage for 2.5 hours. After a 10 minute break, it was CC-discharged at a rate of 0.2 C until the voltage across the two terminals reached 3 V and then CV-discharged at the said voltage for two hours, and the total discharge capacity measured during this CCCV discharging was taken as the initial 2C-CCCV capacity 2C-CCCV Capacity Retention Rate At a temperature of 60° C., each battery adjusted to 100% SOC was subjected to 1000 cycles of charging and discharging. One cycle included CC-discharging at a rate of 2 C until the voltage reached 3 V and subsequent CC-charging at a rate of 2C until the voltage reached 4.1 V. With respect to the battery after completion of the 1000 cycles, in the same manner as the initial discharge capacity measurement, was measured the discharge capacity (2C-CCCV capacity after the durability test). The percentage (%) of the 2C-CCCV capacity after the durability test to the initial 2C-CCCV capacity (i.e., (2C-CCCV capacity after durability test)/(initial 2C-CCCV capacity)×100) was determined as the 2C-CCCV capacity retention rate.

4C-CC Capacity Retention Rate

At a temperature of 60° C., each battery adjusted to 100% SOC was subjected to 1000 cycles of charging and discharging. One cycle included CC-discharging at a rate of 4 C until the voltage reached 3 V and subsequent CC-charging at a rate of 4 C until the voltage reached 4.1 V. Upon completion of 1000 cycles, while CC-discharging the battery at a rate of 4 C until the vole voltage reached 3 V, the discharge capacity was measured. The percentage of the post-cycle discharge capacity (4C-CC capacity after the durability test) to the 4C-CC discharge capacity in the first cycle (initial 4C-CC capacity) was determined as the 4C-CC capacity retention rate Measurement of Reaction Resistance at −30° C.

At a temperature of −30° C., each battery adjusted to 40% SOC was subjected to an alternating-current impedance measurement at a frequency of 0.001 Hz to 100,000 Hz with an applied voltage of 5 mV, and by equivalent circuit fitting of the Nyquist plot, was determined the reaction resistance R$_{ct}$ (Ω) at −30° C.

TABLE 1

| Example | mol % W | mol % Ca | W + Ca (mol %) | W/Ca (mol/ mol) | R$_{ct}$@ −30° C. (Ω) | capacity retention rate (%) 2C-CCCV | capacity retention rate (%) 4C-CC |
|---|---|---|---|---|---|---|---|
| 1 | 0.8 | 0.023 | 0.823 | 34.78 | 0.90 | 87.5 | 78.1 |
| 2 | 0.8 | 0.038 | 0.838 | 21.05 | 0.91 | 87.9 | 80.2 |
| 3 | 0.5 | 0.055 | 0.555 | 9.09 | 0.90 | 88.3 | 80.3 |
| 4 | 0.2 | 0.086 | 0.286 | 2.33 | 0.89 | 88.5 | 80.4 |
| 5 | 0.5 | 0.103 | 0.603 | 4.85 | 0.91 | 88.6 | 80.9 |
| 6 | 1.0 | 0.159 | 1.159 | 6.29 | 0.93 | 89.3 | 81.6 |
| 7 | 0.5 | 0.220 | 0.720 | 2.27 | 0.95 | 89.7 | 82.0 |
| 8 | 0.005 | 0.055 | 0.060 | 0.09 | 2.01 | 86.7 | 68.5 |
| 9 | 0.5 | 0.282 | 0.782 | 1.77 | 1.38 | 89.9 | 82.5 |
| 10 | 0.8 | 0.012 | 0.812 | 66.67 | 0.96 | 84.3 | 68.1 |
| 11 | 0.2 | 0.054 | 0.254 | 3.70 | 0.91 | 85.4 | 69.1 |

As shown in Table 1, in the batteries of Examples 1 to 7 formed using as positive electrode active materials Li-containing composites oxides containing both W and Ca and having a total of 0.26 mol % or more of W+Ca (in a lithium-containing composite oxide as a positive electrode active material, the proportions of these elements contained in the total amount of the metal elements excluding Li) with the value of the W to Ca molar ratio, W/Ca, being in a range of 2.0 to 50, the reaction resistance at a low temperature was suppressed to 0.95Ω or below, and also even after the charge-discharge cycle at a relatively high rate was repeated for 1000 cycles at a high temperature, the high-temperature durability was found good as indicated by the capacity retention rates of around 80% or higher.

On the other hand, with respect to the battery of Example 8 containing as the positive electrode active material a Li-containing composite oxide having a low W content as well as small W+Ca and small W/Ca, the low-temperature reaction resistance was as high as twice or more times the resistance values of Examples 1 to 7, and the charge-discharge cycles at a high temperature and a relatively high rate caused significant decreases in the CC discharge capacity. With respect to the battery of Example 9 with W/Ca being below 2.0 even with W+Ca being 0.26 mol % or more, while the high-temperature durability was good, the low-temperature reaction resistance was as high as approximately 1.5 times those of Examples 1 to 7, resulting in insufficient low-temperature output properties. On the contrary, with respect to the battery of Example 10 with W/Ca being above 50, while suppression of low-temperature reaction resistance was effectuated to about the same level as Examples 1 to 7, repetitive charge-discharge cycles at a high temperature and a relatively high rate caused a significant decrease in the CC discharge capacity. Similarly, with respect to the battery of Example 11 with W+Ca being less than 0.26 mol %, even with W/Ca being in the range of 2.0 to 50, as a result of the high-temperature cycle test, the CC discharge capacity dropped even by a 30% or more from the initial capacity.

In addition, as shown in FIGS. 4 to 8, in the TOF-SIMS spectra related to Sample 3, as various peaks indicating that W and Ca constituted part of the compound, the presence of peaks (areas surrounded by dashed lines in the respective figures) were confirmed at molecular weights corresponding to $LiCaO^+$, $LiCaWO_4^+$, $Li_3CaW_2O_8O^+$, $CaWO_4^-$, $LiCaW_2O_8^-$, etc. In the TOF-SIMS spectra related to Sample 11, the intensities of these peaks were extremely weak as compared to those of Sample 3, or these peaks were essentially nonexistent. These results suggest that in Sample 3, Ca and W contained in the lithium transition metal oxide clearly constituted part of the compound.

Although specific embodiments of the present invention have been described in detail above, these are merely for illustrations and do not limit the scope of the claims. The art according to the claims includes various modifications and changes of the specific embodiments illustrated above.

REFERENCE SIGNS LIST 1 vehicle
20 wound electrode body
30 positive electrode sheet
32 positive current collector
34 positive electrode active material layer
38 positive terminal
40 negative electrode sheet
42 negative current collector
44 negative electrode active material layer
48 negative terminal
50 separator
100 lithium-ion secondary battery

The invention claimed is:

1. A lithium-ion secondary battery comprising a positive electrode and a negative electrode,
wherein the positive electrode comprises, as a positive electrode active material, a lithium transition metal composite oxide having a layered structure, with the lithium transition metal composite oxide comprising at least one species of Ni, Co and Mn and further comprising W and Ca as its metal components, and
the lithium transition metal composite oxide contains at least 0.26 mol % to at most 5 mol % of W and Ca combined when all the metal elements contained in the lithium transition metal composite oxide excluding lithium account for a total of 100 mol %, with the ratio $(m_W/m_{Ca})$ of the number of moles of W contained, $m_W$, to the number of moles of Ca contained, $m_{Ca}$, being at least 2.0 to at most 50, and
wherein the lithium transition metal composite oxide is a lithium-containing composite oxide represented by general formula (I):

wherein, x is a number that satisfies 1.05≤x≤1.25, and conditions that 0.99≤a+b+c+d+e≤1.0, at least one of a, b and c is larger than zero, both d and e are larger than zero, 0.0026≤d+e≤0.05, and 2.0≤(d/e)≤50 are all satisfied.

2. The lithium-ion secondary battery according to claim 1, wherein the lithium transition metal composite oxide comprises all of Ni, Co and Mn as its metal components.

3. The lithium-ion secondary battery according to claim 1 used as a power source of a vehicle.

4. The lithium-ion secondary battery according to claim 1, wherein the lithium transition metal composite oxide contains at least 0.28 mol to at most 2 mol % of W and Ca combined when all the metal elements contained in the lithium transition metal composite oxide excluding lithium account for a total of 100 mol %, with the ratio $(m_W/m_{Ca})$ of the number of moles of W contained, $m_W$, to the number of moles of Ca contained, $m_{Ca}$, being at least 2.0 to at most 40.

5. The lithium-ion secondary battery according to claim 1, wherein the lithium transition metal composite oxide contains at least 0.286 mol % to at most 1.159 mol % of W and Ca combined when all the metal elements contained in the lithium transition metal composite oxide excluding lithium account for a total of 100 mol %, with the ratio $(m_W/m_{Ca})$ of the number of moles of W contained, $m_W$, to the number of moles of Ca contained, $m_{Ca}$, being at least 2.27 to at most 34.78.

6. The lithium-ion secondary battery according to claim 1, wherein the lithium transition metal composite oxide contains at least 0.1 mol % to at most 5 mol % of W when all the metal elements contained in the lithium transition metal composite oxide excluding lithium account for a total of 100 mol %.

7. The lithium-ion secondary battery according to claim 1, wherein the lithium transition metal composite oxide contains at least 0.015 mol % to at most 0.25 mol % of Ca when all the metal elements contained in the lithium transition metal composite oxide excluding lithium account for a total of 100 mol %.

8. The lithium-ion secondary battery according to claim 1, wherein the lithium transition metal composite oxide contains at least 0.1 mol % to at most 5 mol % of W, and at least 0.015 mol % to at most 0.25 mol % of Ca when all the metal elements contained in the lithium transition metal composite oxide excluding lithium account for a total of 100 mol %.

9. The lithium-ion secondary battery according to claim 1, wherein the lithium transition metal composite oxide is a lithium-containing composite oxide represented by general formula (I):

wherein, x is a number that satisfies 1.05≤x≤1.25, and conditions that 0.99≤a+b+c+d+e≤1.0, and each of a, b, c, d and e is larger than zero are all satisfied.

10. A lithium-ion secondary battery comprising a positive electrode and a negative electrode,
wherein the positive electrode comprises, as a positive electrode active material, a lithium transition metal composite oxide having a layered structure, with the lithium transition metal composite oxide comprising at least one species of Ni, Co and Mn and further comprising W and Ca as its metal components, and
the lithium transition metal composite oxide contains at least 0.286 mol % to at most 1.159 mol % of W and Ca combined when all the metal elements contained in the lithium transition metal composite oxide excluding lithium account for a total of 100 mol %, with the ratio $(m_W/m_{Ca})$ of the number of moles of W contained, $m_W$, to the number of moles of Ca contained, $m_{Ca}$, being at least 2.27 to at most 34.78, and
wherein the lithium transition metal composite oxide is a lithium-containing composite oxide represented by general formula (I):

wherein, x is a number that satisfies 1.05≤x≤1.25, and conditions that 0.99≤a+b+c+d+e≤1.0, at least one of a, b and c is larger than zero, both d and e are larger than zero, 0.0026≤d+e≤0.05, and 2.0≤(d/e)≤50 are all satisfied.

11. The lithium-ion secondary battery according to claim 10, wherein the lithium transition metal composite oxide contains at least 0.1 mol % to at most 5 mol % of W, and at least 0.015 mol % to at most 0.25 mol % of Ca when all the metal elements contained in the lithium transition metal composite oxide excluding lithium account for a total of 100 mol %.

12. The lithium-ion secondary battery according to claim 10, wherein the lithium transition metal composite oxide is a lithium-containing composite oxide represented by general formula (I):

$Li_xNi_aCo_bMn_cW_dCa_eO_2$ wherein, x is a number that satisfies 1.05≤x≤1.25, and conditions that 0.99≤a+b+c+d+e≤1.0, and each of a, b, c, d and e is larger than zero are all satisfied.

13. A lithium-ion secondary battery comprising a positive electrode and a negative electrode, wherein
the positive electrode comprises, as a positive electrode active material, a lithium transition metal composite oxide having a layered structure, and
the lithium transition metal composite oxide is a lithium-containing composite oxide represented by general formula (I):

$Li_xNi_aCo_bMn_cW_dCa_eO_2$ wherein, x is a number that satisfies 1.05≤x≤1.25, and conditions that 0.99≤a+b+c+d+e≤1.0, each of a, b, c, d and e is larger than zero, 0.0026≤d+e≤0.05, and 2.0≤(d/e)≤50 are all satisfied.

* * * * *